Figure 1:
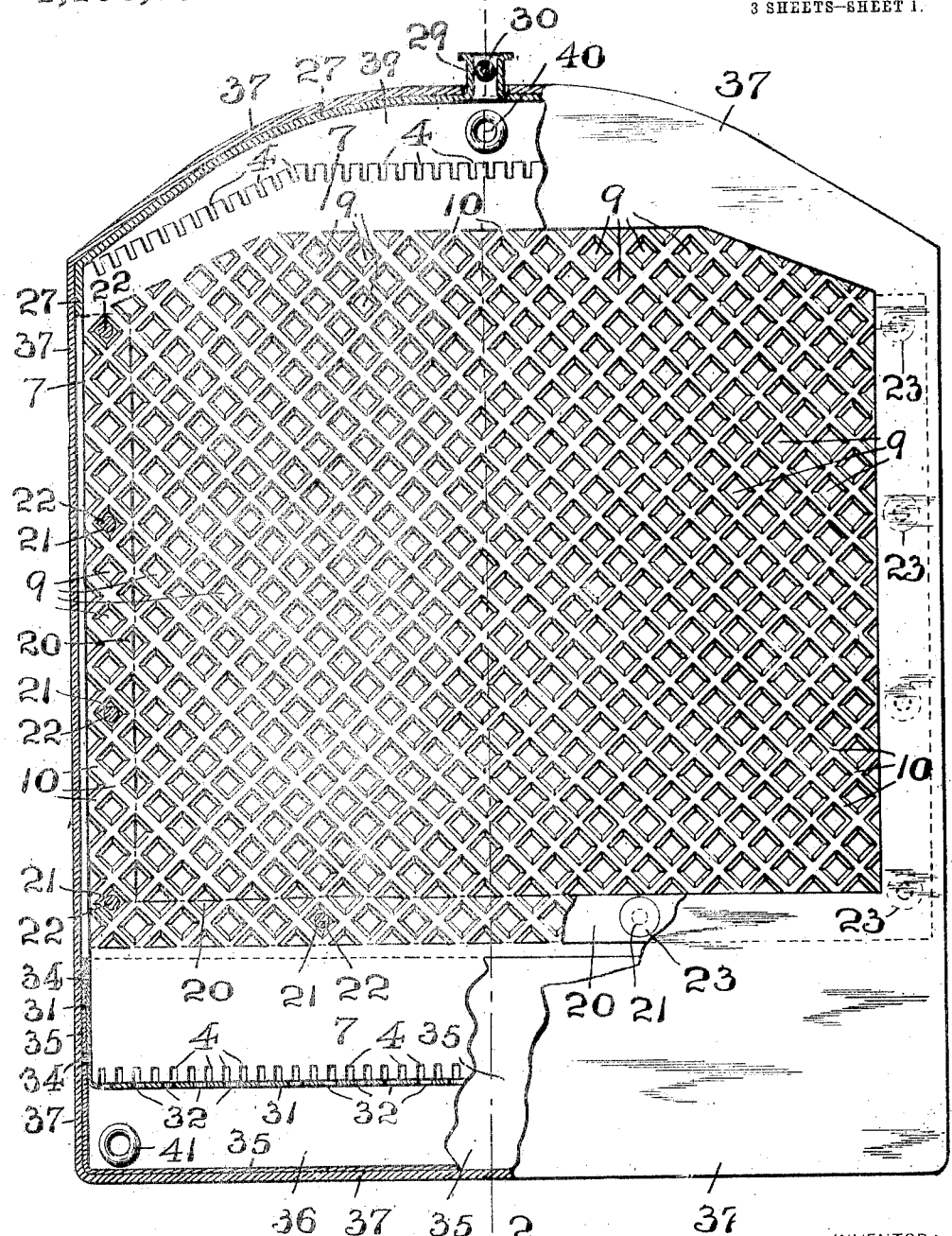

F. A. FELDKAMP.
RADIATOR AND RADIATOR SECTIONS FOR AUTOMOBILES, MOTOR CARS, AND THE LIKE.
APPLICATION FILED APR. 10, 1909.

1,108,494. Patented Aug. 25, 1914.
3 SHEETS—SHEET 1.

INVENTOR:
Frederick A. Feldkamp,
BY
Fraentzel and Richards,
ATTORNEYS

WITNESSES:

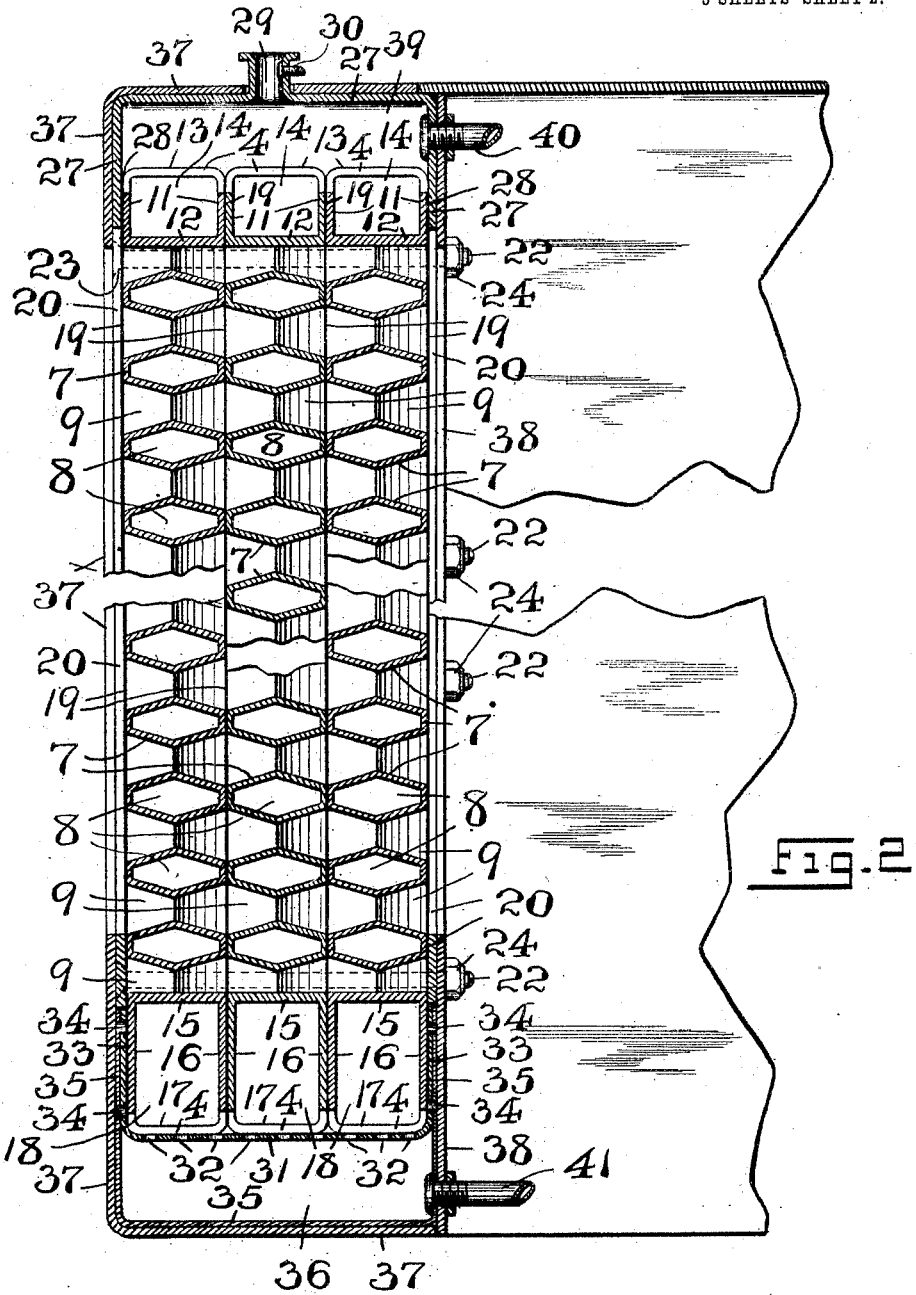

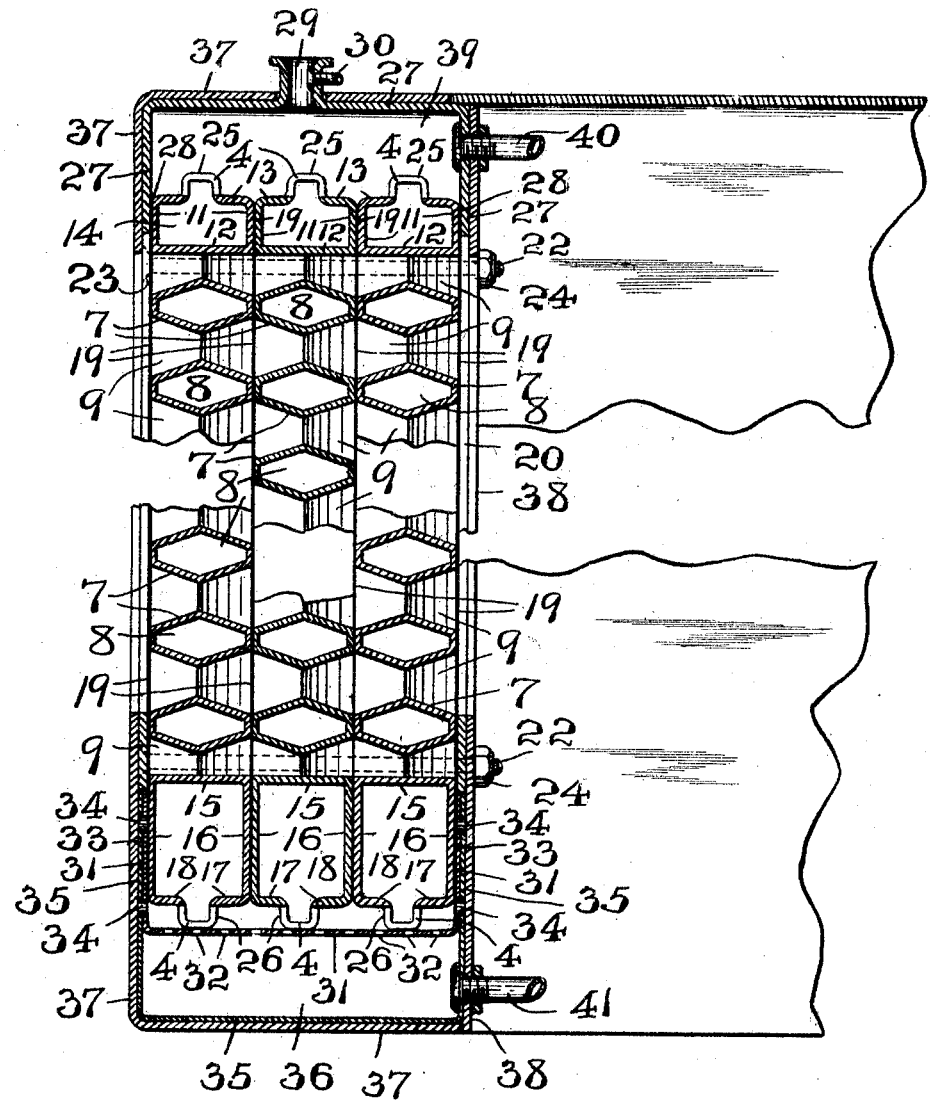

UNITED STATES PATENT OFFICE.

FREDERICK A. FELDKAMP, OF NEWARK, NEW JERSEY, ASSIGNOR TO ELECTROLYTIC PRODUCTS COMPANY, A CORPORATION OF NEW JERSEY.

RADIATOR AND RADIATOR-SECTIONS FOR AUTOMOBILES, MOTOR-CARS, AND THE LIKE.

1,108,494.

Specification of Letters Patent. Patented Aug. 25, 1914.

Application filed April 10, 1909. Serial No. 489,17_.

*To all whom it may concern:*

Be it known that I, FREDERICK A. FELDKAMP, citizen of the United States, residing at Newark, in the county of Essex and State of New Jersey, have invented certain new and useful Improvements in Radiators and Radiator-Sections for Automobiles, Motor-Cars, and the like: and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in radiators for use with automobiles, motor cars, and the like.

The present invention, therefore, has for its principal object to provide a novel and simply constructed radiator for automobiles, motor-cars, and the like, with a view of providing a radiator of the general character hereinafter more fully set forth which is non-collapsible and is protected against expansion; which is constructed in a very light and efficient manner, and in which, all things being equal, maximum radiating surfaces are disposed of in a minimum space; and, furthermore, to provide a novel construction of an automobile radiator at a relatively small cost.

The invention has for its further object to provide a radiator of the general construction hereinafter set forth having a novel arrangement of water-receiver from which the water is admitted into, and out of the various elements or radiator-sections, into a water-discharging tank or receptacle as will hereinafter more fully appear.

Other objects of this invention not at this time more particularly enumerated will be clearly understood from the following detailed description of the present invention.

With the various objects of my present invention in view, the invention consists, primarily, in the novel radiator for automobiles, motor-cars, and the like, hereinafter set forth: and, the invention consists, furthermore, in the novel arrangements and combinations of devices and parts, as well as in the details of the construction of the same, all of which will be more fully described in detail in the following specification, and then finally embodied in the clauses of the claim which is appended to and which forms an essential part of this specification.

The invention is clearly illustrated in the accompanying drawings, in which:—

Figure 1 is a view, partly in front elevation and partly in transverse vertical section, of a radiator embodying the principles of my present invention; and Fig. 2 is a vertical section of the same, on an enlarged scale, said section being taken on line 2—2 in said Fig. 1. Fig. 3 is a similar sectional representation, like that illustrated in Fig. 2, but representing a slightly modified form of radiator-sections or elements.

Similar characters of reference are employed in the above described views, to indicate corresponding parts.

Referring now to the drawings, the reference-character 8 indicates the chambered portions of each section or element 7, and 9 indicates the openings formed for cooling purposes, all of which are provided by the angularly disposed portions 10 which cross each other substantially in the manner illustrated. These portions 10 are connected at the top of each radiator-section or element with the walls 11, 12 and 13, so as to form a top-chamber 14 with which all the chambered portions 8 are in communication. Extending across the portions 13 and partly down the portions 11 are the saw-cuts or recesses 4, forming a number of suitably disposed inlets. In a like manner, the portions 8 are connected at the bottom of each radiator-section or element with the walls 15, 16 and 17, so as to form a bottom-chamber 18 with which the said chambered portions 8 are also in communication. Extending across the portions 17 and partly into the portions 16 are the second set of saw-cuts or recesses 4, forming a number of suitably disposed outlets in the bottom of the radiator-section.

In securing any number of radiator-sections or elements together the front and rear faces of the sections are first tinned and the several sections are placed one upon the other, in perfect registration with each other, so that the various openings 9 in the sections will be in perfect alinement and will provide a series of air-ducts or passageways entirely through the radiator. After having secured this number of assembled radiator-sections or elements together, under suitable pressure, in a suitable clamping device or mechanism, the combination of assembled radiator-sections or elements is placed in an oven and subjected to the heat thereof. The heat will cause the tin at the exposed edge-portions of the assembled sections or elements to melt and become softened, after which the assembled elements or sections are removed from the furnace or oven and allowed to cool, whereupon all the radiator-sections or elements become thoroughly united or soldered together, as at 19, as will be clearly evident.

Since the soldered parts are not used to produce the water-spaces, it will be evident, that no leaks will result in case the soldered parts should at any time become separated. A suitable frame 20, which is preferably of a U-shaped configuration, as indicated in dotted outline in Fig. 1, provided with suitably disposed holes 21, is then placed upon the front and rear faces of the assembled radiator-sections or elements, the clamping device or mechanism having been previously removed, and the parts are united by means of suitable bolts 22. The heads 23 of these bolts are preferably made in the manner of a tapered screw-head and are arranged in the correspondingly shaped holes in the frame 20, at the front, so that the parts will be flush, while the opposite and screw-threaded portions of said bolts project through the openings in the frame 20 upon the rear, to receive the nuts 24 for firmly and rigidly securing the assembled radiator-sections or elements together against separation by jarring or shocks to which the radiator is subjected when placed in position upon the frame-work of a vehicle.

If desired, the upper and lower portions of each radiator-section or element may be made with the reduced end-portions or projections 25 and 26 extending, respectively, beyond the portions 13 and 17, in a manner indicated in Fig. 3 of the drawings, said projections being provided with the saw-cuts or recesses 4, as shown. The purpose of using these projections is to obviate any danger of the solder flowing into the saw-cuts or recesses during the heating process of the assembled radiator-sections or elements; and, furthermore, to provide an unobstructed side-exit for the outflowing water.

To complete the radiator for use upon an automobile, motor-car, or the like, a shell or casing 27, in the form of a hood or cap, is arranged over the upper portions of the assembled radiator-sections or elements, generally of the configuration shown and secured in the manner illustrated in Figs. 1 and 2, preferably by means of a suitable solder 28. The said shell or casing 27 is provided in its upper portion with a suitably formed nozzle 29, providing an inlet for filling purposes, and 30 is an overflow-pipe which extends from the side of said nozzle 29, or other suitable part of said shell or casing 27.

The lower portions of the assembled radiator-sections or elements are snugly fitted into a pan-shaped shell or casing 31, which acts as a support to remove the weight of the assembled radiator-sections from the two end-sections, said shell or casing being provided in its bottom with a series of holes or perforations 32, said shell or casing being suitably secured to the lower portions of said radiator-sections preferably by means of a solder, as 33. Surrounding the said pan 31 and secured to the sides thereof by means of rivets 34, or any other suitable fastening means, is another pan-like shell or casing 35, which extends below the bottom of the shell or casing 31, so as to provide a water-receiving receptacle or reservoir 36. Surrounding these several devices and parts is the usual open-ended automobile-hood 37, and 38 is an additional frame-like plate which may be placed upon the back of the assembled parts, and is secured in place by being arranged upon the end-portions of the previously mentioned bolts 22 and the nuts 24 thereon. Leading into the chamber 39 formed by the shell or casing 27 is a pipe 40 coming from the water-jacket of the engine, and extending from the receptacle or reservoir 30 is an outlet-pipe 41 which leads to the water-jacket of the engine.

The operation of the devices as a radiator for automobiles, auto-cars, and the like, will be clearly evident from the foregoing description of my present invention, and from an inspection of Figs. 2 and 3 of the drawings.

After having in the above described manner completed a radiator, the same can be fastened in its operative position upon the frame-work of the vehicle in any suitable and well-known manner.

By providing radiator-sections, as herein before stated, in their opposite edge-portions with a multiplicity of suitably disposed water-inlets and water outlets, located respectively below a water-receiving receptacle 36 and a water-receiving chamber 39, the water is distributed over a considerable length of the top-edge of each radiator-section, and by means of the numerous inlets is distributed uniformly to all parts within the radiator-section, so that there will be no choking of the water as it passes through the radiator-section, and the greatest cooling efficiency is thus obtained. The outflow openings in the bottom edge of the radiator-section permit of a rapid collection of the cooled water in the receiving chamber 9. By the arrangement and construction of the assembled radiator-sections made according to the principles of the present invention, a radiator also is the result which is made of radiator-sections, each section in itself covering a space equal to the front area or face of the radiator, whereby, all things being equal, an increased cooling area, in this respect, with a consequent increase in efficiency is the result.

I claim:—

1. A radiator for automobiles and the like, comprising a series of radiator-sections, each radiator-section being made in the form of a casing provided with interiorly disposed ducts, each radiator-section being also formed with hollow top and bottom-portions providing chambers with which the said ducts communicate, said top and bottom portions being respectively provided with inlet and outlet-openings, and each radiator-section being formed with a multiplicity of openings providing air-passages interspersed between said ducts, U-shaped frames arranged upon the opposite sides of said sections, said frames being provided with bolt-holes, a series of bolts extending through said holes and through some of the openings in the radiator-sections, and nuts upon said bolts for securing a number of radiator-sections side by side, a water-receiving hood mounted upon the upper portions of said radiator-sections, and a lower water-receiving shell extending downwardly from the lower portions of said radiator-sections.

2. A radiator for automobiles and the like, comprising a multiplicity of hollow radiator-sections, and a perforated pan-shaped bottom in which the lower portions of said sections rest, said bottom providing a support for said sections and a pan-like shell beneath said bottom, forming a water receiving receptacle, the perforations in said bottom establishing communication with the interior of said hollow radiator-sections and the said water-receiving receptacle.

In testimony that I claim the invention set forth above I have hereunto set my hand this 8th day of April, 1909.

FREDERICK A. FELDKAMP.

Witnesses:
   FREDK. H. W. FRAENTZEL,
   FREDK. C. FRAENTZEL.